June 21, 1949.　　　D. E. AUSTIN ET AL　　　2,473,500
VEHICLE SPRING SUSPENSION
Filed March 23, 1944　　　　　　　　　　　4 Sheets-Sheet 1
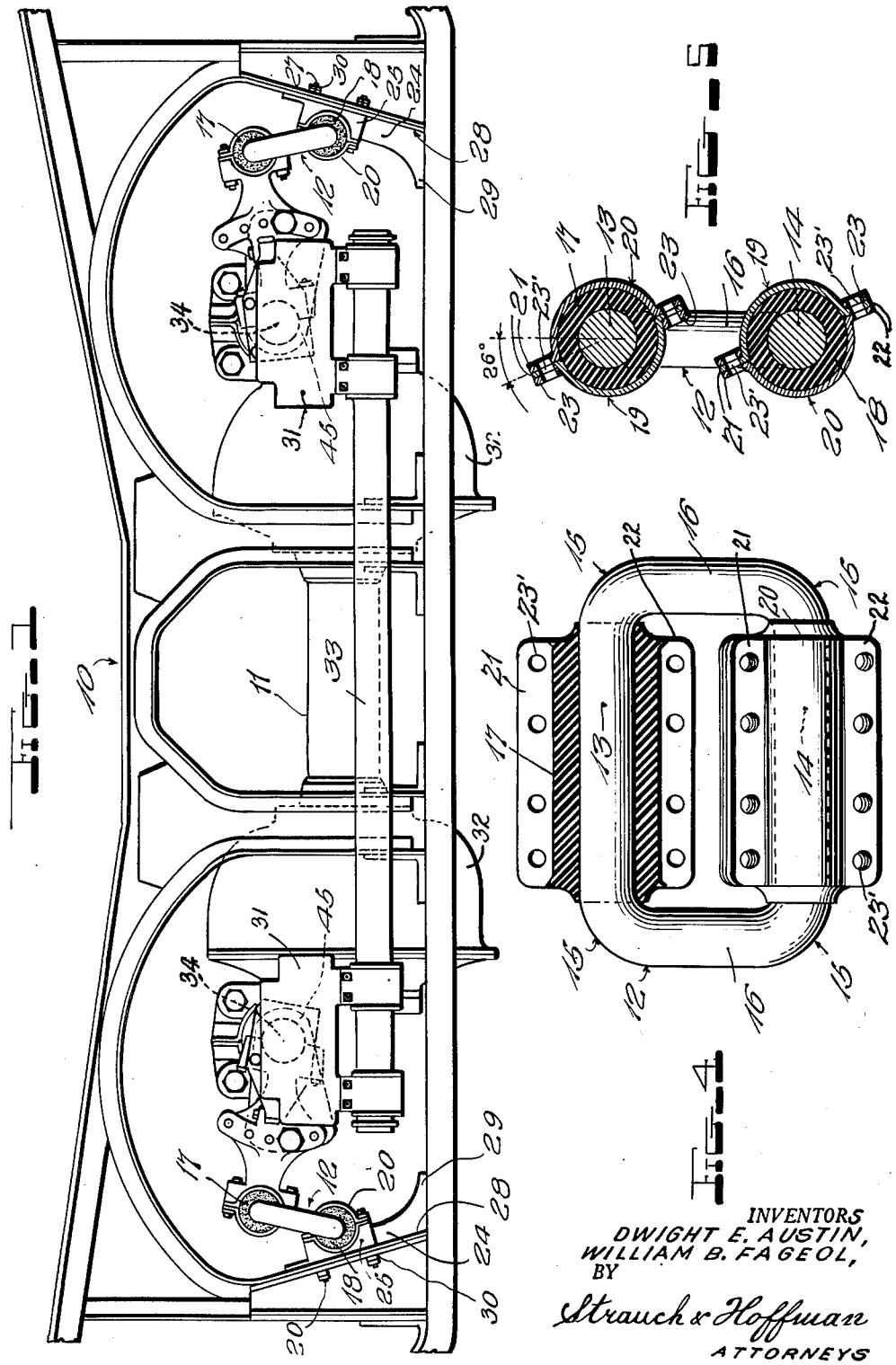
INVENTORS
DWIGHT E. AUSTIN,
WILLIAM B. FAGEOL,
BY
Strauch & Hoffman
ATTORNEYS

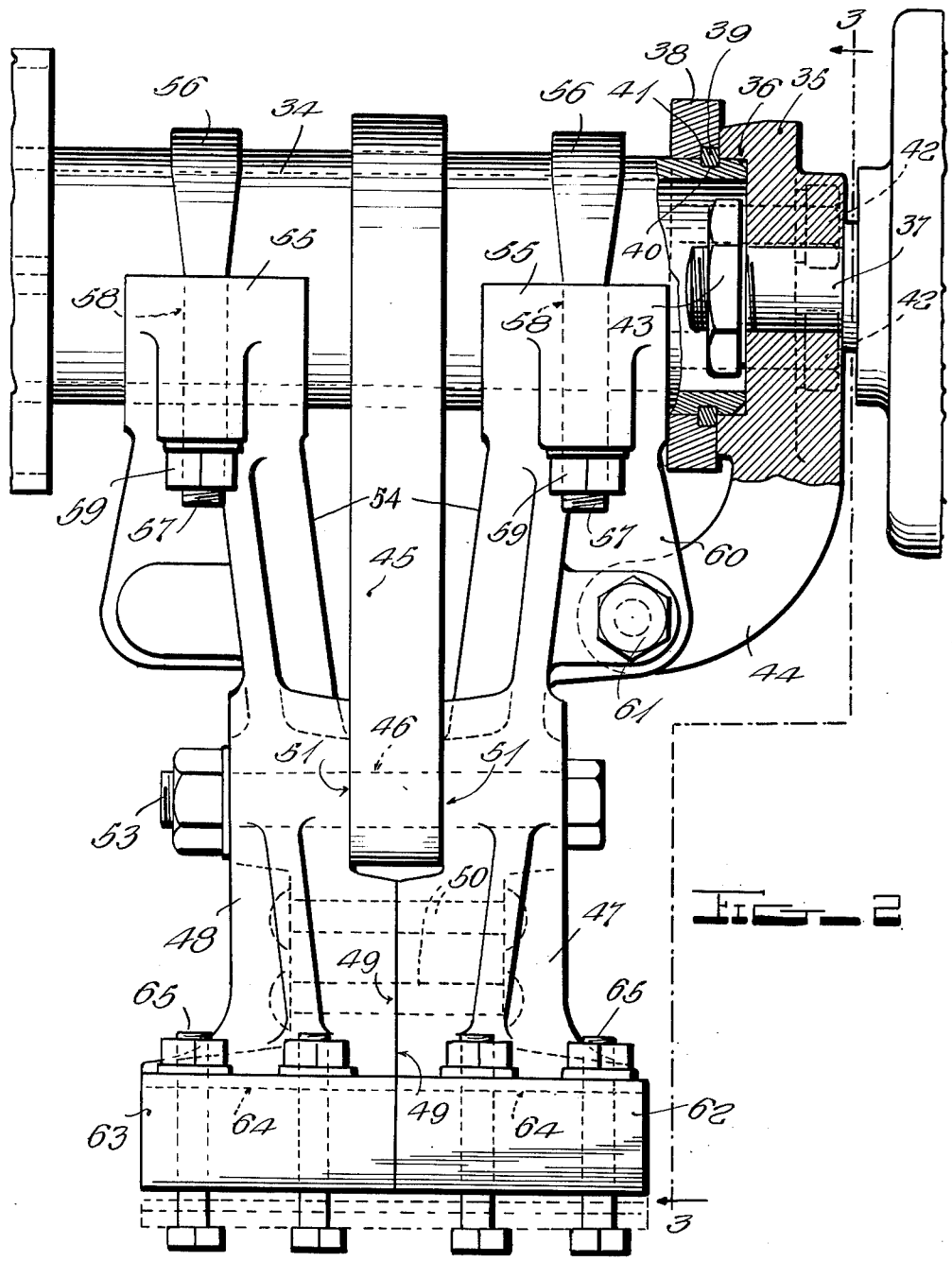

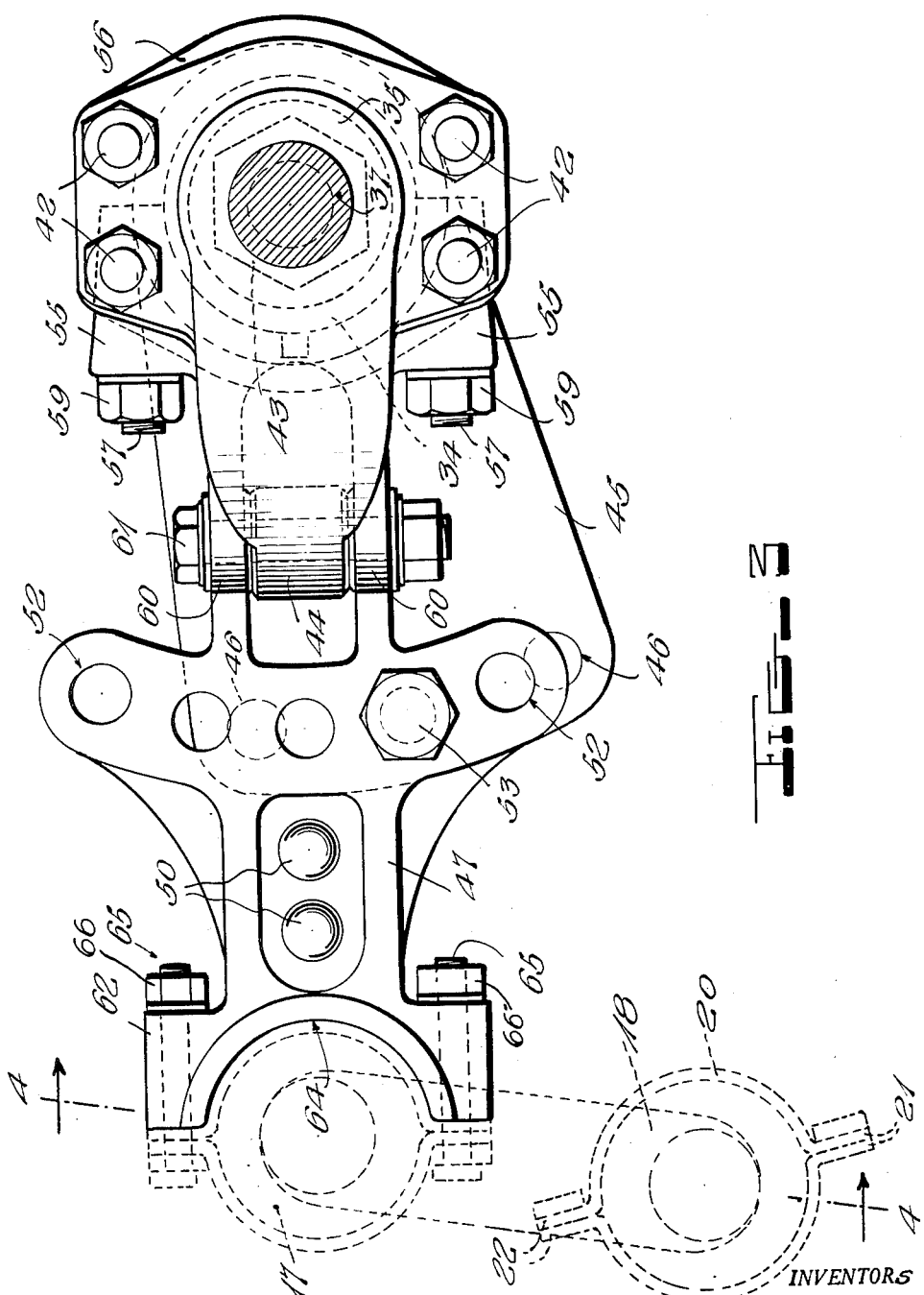

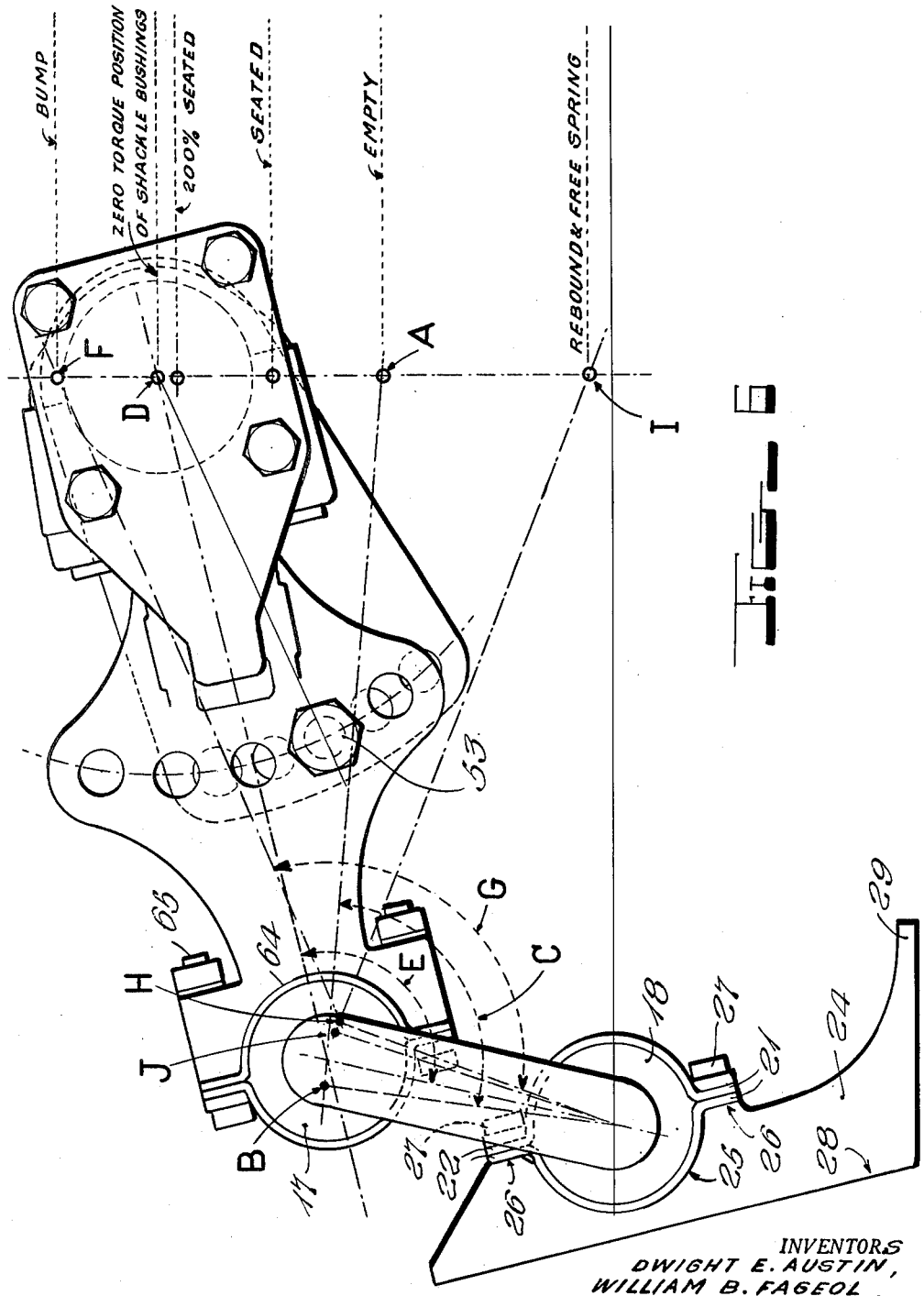

Patented June 21, 1949

2,473,500

UNITED STATES PATENT OFFICE 2,473,500

VEHICLE SPRING SUSPENSION

Dwight E. Austin and William B. Fageol, Kent, Ohio, assignors to Twin Coach Company, Kent, Ohio, a corporation of Delaware Application March 23, 1944, Serial No. 527,777

6 Claims. (Cl. 267—21)

This invention relates to vehicle spring suspensions and more particularly to suspensions of the torsion type in which the spring member is rendered functionally effective by a rotary wind-up transmitted to said member through suitable linkage connections with the vehicle axle.

Such spring suspensions as heretofore proposed involve the use of more or less complex linkage systems requiring frequent adjustment in order to prevent overloading and stressing of the spring members beyond the elastic limits. Also, factory installation and adjustment of the spring members is necessary, and in the event of structural deterioration or failure said member is not readily replaceable.

It is, therefore, the general object and purpose of our invention to provide a greatly simplified torsion spring suspension for vehicles in which destructive stresses on the spring member are minimized under all conditions of vehicle operation, and in which the suspension is so designed and connected with the vehicle axle and body frame as to provide an improved, stabilized cushioned ride when the vehicle is either partly or fully loaded.

Our present invention also has for one of its major objects to provide a novel vehicle spring suspension in which the torsion spring member is so mounted and arranged and connected to the vehicle axle and body frame, that between empty and capacity load conditions of the vehicle said member will tend to exert an inward and upward thrust upon the vehicle axle and will be placed under positive torsional stress only, when, under substantial loads, the wheels encounter an obstruction and the axle is elevated relative to the vehicle body.

Another important object of the invention is to provide a vehicle suspension as above characterized, in which the torsion spring members are embodied in the shackle connections between the vehicle body frame and axle, to serve either as the sole spring suspension means of the vehicle, or to supplement and control the action of the standard or conventional metal leaf or coil spring suspension.

A more particular object of the invention resides in the provision of a shackle link having an upper and lower bearing bushing of rubber or other elastic material, each enclosed by an attaching housing, said bushings being vulcanized or bonded to the link and housings, with attaching flanges of the latter positioned inpredetermined angular relation to the shackle link, so that when the upper bushing housing is attached to the suspension lever on the vehicle axle, the rubber will be automatically placed under negative wind-up or torsional stress from its neutral position.

A further object of the invention is to provide a vehicle suspension shackle having a torsional spring bushing in which the torsional stresses are so distributed under all conditions of vehicle loading and operation as to obviate over stressing and rapid deterioration of the bushing due to fatigue, and which will effectively dissipate road shocks and neutralize lateral side sway of the vehicle body and the effects of centrifugal force on curves.

An additional object of the invention is to provide a vehicle shackle and torsion spring suspension unit which, in the case of severe damage or failure, can be readily replaced, skilled factory assistance being unnecessary, as the simple operation of bolting the bushing housings in place completes the assembly, without further individual adjustment.

Among other subordinate objects of the invention is the provision of a torsional spring suspension for vehicles which is of simple, rugged and inexpensive construction, and, while particularly designed for use on motor passenger coaches, may be advantageously applied to light or heavy vehicles intended to serve a variety of different purposes.

The foregoing and other objects of the invention are attained in a selected embodiment thereof, as will presently be disclosed in the following description and subjoined claims, when considered in connection with the annexed drawings, wherein similar reference characters designate corresponding parts throughout the several views, and in which:

Figure 1 is a rear end elevation showing the driven axle of the vehicle and parts of the body supporting frame and illustrating one application of a preferred embodiment of the present invention thereto;

Figure 2 is a top plan view of the linkage connection between the top shackle bushing and the vehicle axle;

Figure 3 is a vertical sectional view taken substantially on the line 3—3 of Figure 2;

Figure 4 is an enlarged longitudinal section through the top shackle bushing, taken substantially on the line 4—4 of Figure 3;

Figure 5 is a transverse sectional view showing the relative position of the attaching flanges with respect to the shackle link in the normal neutral positions of the torsional spring bushings; and Figure 6 is a semi-diagrammatic view illustrating different positions of the vehicle axle and the functional action of the shackle bushing under various conditions of vehicle operation.

Referring in greater detail to the drawings, in Figure 1 thereof, we have shown a preferred embodiment of our novel spring shackle assembly as applied to a conventional type of passenger coach, in which the coach body is supported by a skeleton frame structure, partially illustrated at 10. By means of our novel spring suspension, the front and rear vehicle axles are connected with the body frame 10 so that relative vertical and lateral tilting movement between the sprung and unsprung masses will be effectively cushioned, road shocks which would otherwise be transmitted to the vehicle body being substantially wholly neutralized and dissipated by the suspension units.

In the present instance, we have disclosed the fundamentally novel features of the invention as embodied in a spring shackle unit connected with the vehicle body frame and axle so as to effectively cushion relative vertical movement therebetween and also function as a lateral stabilizer for the vehicle body. In Figure 1 we have shown the spring shackle units connected between the opposite ends of the rear axle 11 and the vehicle body frame, and it will be understood that the following detailed description of one of the rear spring suspension units is equally applicable to the spring shackle connections between the ends of the front vehicle axle and the body frame 10.

Referring now to Figures 4 and 5 of the drawings, each suspension unit comprises a shackle link, generally indicated at 12. This link is of substantially rectangular elongated form and of structurally continuous, substantially uniform diameter. The side portions 13 and 14 of the shackle link are spaced apart a predetermined distance and extend in parallel relation with each other, said side portions of the link being integrally joined at their opposite ends by the curved sections 15, with the end portions 16 of the shackle link. In the installed position of the shackle, the link portions 13 and 14 thereof extend longitudinally of the vehicle body frame and will hereinafter be referred to as the upper and lower ends of the shackle.

The upper and lower ends of the shackle link 12 are provided with bushings 17 and 18, respectively, of rubber or other resilient material. These bushings are substantially co-extensive in length with the link portions 13 and 14 and are of substantially uniform wall thickness. Each bushing is enclosed within a metal housing, which, as herein shown, comprises two semi-cylindrical sections 19 and 20, respectively, which are molded upon the cylindrical surface of the bushings. Each of these housing sections at its opposite edges is formed with a laterally projecting flange, 21 and 22, respectively, adapted to be engaged in mating face to face contact with the corresponding flanges of the other housing section. To the outer side faces of the flanges on housing sections 19, the reinforcing metal strips 23 are welded or otherwise secured. These strips and the flanges 21 and 22 are provided with registering longitudinally spaced apart openings indicated at 23' to receive the attaching bolts, as will presently be described. The inner and outer peripheral surfaces of each bushing are securely bonded or vulcanized to the shackle link and the attaching housings, respectively.

From reference to Figure 5 of the drawings, it will be noted that the metal housings for the rubber torsion bushings are positioned with their attaching flanges disposed in predetermined angular relation to a median perpendicular plane intersecting the axes of the link portions 13 and 14. In one typical application of the invention, for a vehicle body of known weight and load capacity, this angle for the attaching flanges of each bushing housing is substantially 26°, so that in the neutral condition of the upper and lower torsion bushings the attaching flanges thereof are disposed in substantially parallel planes.

While various means may be employed for connecting the shackle bushing housings with the sprung and unsprung masses, respectively, of the vehicle, we preferably provide the construction illustrated in Figures 1, 2 and 3 of the drawings. As shown, the housing section 20 for the lower torsion bushing 18 of the shackle is seated in a semi-circular cavity 25 formed in one side face of the pillow block 24. Above and below this cavity, the flanges 21 and 22 of said housing section seat against the surfaces 26 on the pillow block. The bushing housing is rigidly secured to the pillow block by the attaching bolts 27 extending through the registering openings in the housing flanges and coinciding openings in the pillow block 24, the heads of said bolts having bearing contact against the reinforcing strips 23. The opposite side face of the pillow block is vertically inclined as shown at 28 with respect to the base flange 29 of said block for engagement against similarly inclined parts of the vehicle body supporting frame 10. Certain of the attaching bolts 27 are sufficiently long to extend through openings in the frame part. Thus when the nuts 30 on the attaching bolts are tightened, the pillow block will be rigidly fixed to the body supporting frame and the bushing housing immovably secured upon the seat 25 of said pillow block.

The upper shackle bushing 17 is connected with the vehicle axle 11 by the lever construction illustrated in Figures 2 and 3 of the drawings, which extends inwardly from the shackle, and is mounted at its inner end for rocking movement about an axis parallel to the pivotal axis of the shackle. While this connecting lever and mounting therefor may be of various structural forms, we preferably employ the novel lever construction shown, which has been found to be very efficient in functional operation and capable of easy and quick assembly.

Referring now to Figure 1 of the drawings, at the opposite ends of the rear axle unit 11, suitable bracket members 31 are rigidly mounted upon the axle drive gear housings 32 and connected with each other by the transverse tie rod 33. Similar bracket members are mounted at opposite ends of the front wheel axle of the vehicle (not shown). The inner ends of the shackle suspension levers may be pivotally supported for movement relative to said bracket members in various ways, but we, preferably, adjustably attach said levers at opposite sides of the vehicle to tubular rods mounted for rocking movement between the front and rear brackets.

In Figure 2 of the drawings, the rear end portion of one of the tubular rods 34 is shown, said end of the rod being engaged in a recess 36 in one side face of a member 35 which is loosely mounted for rocking movement upon a stud or gudgeon 37 formed on the bracket member 31. A collar 38 is loosely engaged upon the end of the tube 34 and a retaining ring 39 for said collar is seated in a groove 40 in the periphery of the tube, the outer portion of said ring being received in the annular recess 41 formed in the inner face of the collar 38. The member 35 is connected with collar 38 by the bolts 42, whereby the end of the tube 34 will be tightly seated against the base wall of the recess 36. This assembly is retained in connected relation with the bracket stud or gudgeon 37 by the nut 43 threaded on the end of said stud within the recess 36 of member 35. The member 35 is formed with a laterally extending curved arm 44 for a purpose which will presently be explained.

In longitudinally spaced relation from the member 35 one end of an arm 45 is welded or otherwise rigidly fixed upon the tube 34 and extends outwardly therefrom at substantially right angles to the axis of said tube. Preferably, this arm gradually increases in width to its outer end where it is provided with a plurality of openings 46 substantially equidistantly spaced from each other along an arc which is concentric with the axis of tube 34.

Complementary lever sections 47 and 48, respectively, are arranged at opposite sides of the arm 45. These lever sections have relatively thick outer portions and beyond the end of the lever 45 are securely connected against relative movement, and in contact with each other along the meeting line 49, by a plurality of rivets or other equivalent connecting members 50. Inwardly of the meeting faces 49 the lever sections are provided with the finished faces 51 for abutting contact with the opposite side faces respectively of the arm 45. These portions of the lever sections are arcuately curved on substantially the same radius as the outer end of the arm 45 and are provided with the equidistantly spaced openings 52 therein for selective registry with one of the openings 46 in said arm. These registered openings receive the adjusting bolt 53 whereby the lever sections may be rigidly connected with the arm 45 and in various angular positions with respect thereto. The lever sections 47 and 48 are formed with the arms 54 extending inwardly from the portions 51 thereof and in laterally divergent relation therefrom. These lever arms 54 terminate in the semi-cylindrical or half bearings 55 which are rigidly secured against the outer side of the tube 34 by the yoke members 56 which extend around the inner side of said tube and are provided with cylindrical threaded shank extensions 57 engaged through the bores of bosses 58 formed on the bearings 55 and receive the nuts 59 whereby said lever bearings 55 are rigidly clamped to the tube 34 against rotative movement relative thereto. Spaced apertured webs 60 are formed on the outer side of one of the lever arms 54 between which the apertured end of the arm 44 on member 35 is received. The bolt 61, engaged through the aligned apertures, connects the arm 44 with the lever arm 54 to thus provide a very rigid assembly of the lever structure upon the end of the tube 34 and precludes relative rotational or longitudinal movements between the parts of said lever assembly and the tube. The outer end of each lever section 47 and 48 is formed with substantially rectangular bearing portions 62 and 63, respectively, said bearing portions having aligned concave seating faces 64 for the housing section 20 of the upper shackle bushing 17. The upper and lower ends of the bearings 62 and 63 are provided with spaced transverse openings to register with the openings 23' in the housing flanges and receive the attaching bolts 65. When the nuts 66 are tightened upon the ends of said bolts the bushing housing is securely clamped upon the bearing seat 64 for movement as a unit with the lever structure relative to the shackle link.

From reference to Figure 1 of the drawings, it will be noted that the shackle links at opposite sides of the vehicle frame extend upwardly and inwardly from the lower torsion bushing 18 to the upper torsion bushing 17. Therefore in relative vertical movement between the sprung and unsprung masses, the greater part of the torsional stress will revolve upon the upper shackle bushing 17 in the relative angular movement between the shackle links and the lever assemblies mounted on the vehicle axle. With reference to Figures 1 and 6 of the drawings, for convenience in description, rotational stress of the shackle bushing 17 in a clockwise direction will be referred to as "negative wind-up" while rotation of said bushing in an anti-clockwise direction will be referred to as "positive wind-up." Before mounting the vehicle body on the frame 10, the lower bushing 18 and its housing is first attached to the pillow block 24 on the frame. Therefore, in attaching the housing of the upper torsion bushing 17 to the connecting lever structure on the vehicle axle, with the latter in the position shown in Figure 1, it is necessary to turn or rotate the bushing housing from the position shown in Figure 5 where the torsional stress in the bushing is zero or neutral, to the position shown in Figure 1. In the typical example which we have selected for illustrative purposes, this rotation of the bushing housing in a clockwise direction relative to the shackle link produces a minus or negative torsional wind-up of the rubber bushing of approximately 30°. When the vehicle body is mounted upon the frame 10, a relative vertical movement between the sprung and unsprung masses occurs, and, the axle end of the connecting lever structure will then be positioned approximately at the point A relative to the lower shackle bushing 18, as shown in Figure 6. This results in a relative angular movement between the shackle link and the lever, the axial center of the upper shackle bushing 17 moving to the position B, and reducing the negative wind-up of the bushing to approximately 23°. With the vehicle empty or unloaded the angle C between the shackle link and the connecting lever structure is approximately 93°. As the vehicle is loaded, with each increment of increase, the negative wind-up and torsional stress in one direction from neutral or zero position is proportionately reduced, until at full load or capacity loading of the vehicle, the bushing 17 closely approaches the neutral or zero torque position. In the latter position of the torsion bushing the axle end of the lever structure is at substantially the position D with respect to the lower shackle bushing 18. Thus the lever and shackle links will have a relative angular movement towards a straight line position, this angle E, in the present instance, being approximately 116°. Thus it will be seen that in this position of the parts as shown in full lines in Figure 6, the housings of the torsion bushings are disposed in substantially the same relative normal positions as shown in Figure 5 of the drawings. By pre-stressing the bushing 17 so that when the vehicle is fully loaded, the bushing is in substantially neutral torque position, this bushing, which has much greater windup than the bushing 18 in response to abnormal road shock, is kept within the torsional range of the rubber. Of course it will be understood, that the bushing material is carefully selected and tested for the required elastic characteristics so that, when in neutral or zero torque position, the bushing 17 will properly cooperate with the lower bushing 18 so that the bushings act as static cushioning members to elastically sustain and cushion the sprung vehicle mass, plus a capacity load against minor road shocks.

When the vehicle wheel strikes an obstruction in the road, and there is a further upward movement of the axle end of the shackle lever connection to approximately the point F, there will be a further relative angular movement between the shackle link and the lever to an angle of substantially 134° as indicated at $G$. Therefore, the bushing 17 will be rotated in an anti-clockwise direction past the neutral position to produce a positive wind-up therein of substantially 18°. At this time, the axial center of the shackle bushing 17 will be located approximately at the point H. In the rebound, after passing over the obstruction, the axle position of the shackle lever is approximately that indicated at I, and in the angular movement between the shackle link and the lever the axial center of the torsion bushing 17 moves to approximately the point J, thus rotating the bushing in the clockwise direction past the neutral position and again producing negative wind-up therein. Thus the rebound action will be elastically cushioned as the shackle link and lever connections return to their normal relative positions as shown in full lines in Figure 6. It will of course also be evident that, should the vehicle wheel enter a depression in the road surface, the axle end of the shackle lever will be lowered from the position D to momentarily partially restore negative wind-up in the shackle bushing 17.

From the above description it will be seen that by predetermining the positions of the attaching housings for the torsion bushings with respect to the upper and lower ends of the shackle links so that a negative wind-up stress is placed upon the upper bushing 17 automatically in the attachment of the bushing housing to the outer end of the shackle lever, the possibility of destructively stressing the bushing structure beyond its elastic limit, by rotation thereof in the positive wind-up direction as the shackle links and lever move toward the straight line position, is effectively precluded. Of course, as the upper shackle bushing 17 is rotated in the negative wind-up direction the angular movement of the shackle link will produce a slight positive wind-up of the lower bushing 18, and when the upper bushing 17 is rotated in the positive wind-up direction, there will be a similar slight rotation of the lower bushing in the negative wind-up direction. However, these torsional stresses in the lower shackle bushing 18 are relatively slight. Of course, both the upper and lower bushings will act as resilient bearings to absorb minor road shock or jars and prevent their transmission to the vehicle body. Our invention is particularly desirable for use in the suspension systems of passenger coaches. By predetermining the initial negative wind-up in the upper shackle bushing 17 in accordance with the known weight of the sprung mass and the maximum loading capacity of the vehicle body, the positive torsional wind-up or stressing of the bushing 17 under the most severe shock is reduced to safe limits. Also the same shock-free riding qualities will be obtained in such vehicles when either fully or partly loaded. However, it is contemplated that the principles involved in our present invention may also be applied, though perhaps in somewhat modified structural form, to a wide range of vehicles designed for other uses and for the transportation of light or heavy loads.

It is to be particularly noted as one of the important practical features of our invention that factory installation of the shackle unit is not required and should this unit become seriously damaged or its proper functional operation impaired, it can be readily replaced by a new unit. Since the bushing housings are pre-located relative to the ends of the shackle links, no adjustment of the bushings is required at the time of installation, and it is only necessary to attach said housing to the pillow block 24 and the end of the shackle lever to automatically produce the proper negative torsion wind-up in the upper shackle bushing 17.

Referring again to Figures 1 and 6 of the drawings, it will be noted that the above-described directions of rotation of the shackle bushing 17 for negative and positive wind-up, respectively, apply to the shackle unit at the left hand end of the vehicle axle. Therefore, it will be understood that in the shackle unit at the right hand end of the axle, these directions of rotation of the upper bushing 17 are reversed. In other words, anti-clockwise rotation of the bushing housing will produce negative torsional wind-up of the bushing from neutral position, while clockwise rotation of said housing will produce positive torsion wind-up of the bushing. Thus it will be evident, that in response to centrifugal or other forces laterally imposed upon the vehicle body, the shackle bushings 17 at opposite sides of the vehicle will have a compensating action tending to stabilize the vehicle body against side sway. With a fully loaded vehicle and the bushings 17 in the neutral position shown in Figure 6, in the swinging movements of the shackle links, there will be a negative torsional wind-up of the bushing 17 at one side of the vehicle and a corresponding positive torsional wind-up of the bushing 17 at the opposite side thereof. Therefore, such forces will be dissipated in the shackle bushings and the vehicle body substantially maintained in its position of normal stable equilibrium with respect to the vehicle axle.

We have also found the lever connections between the upper shackle bushings and the vehicle axles, as above described, to be very desirable, as the several parts thereof may be easily and quickly assembled and by adjusting the lever parts 47 and 48 at opposite sides of the vehicle with respect to the arm 45 and then securing the same in rigidly fixed relation with said arm by means of the bolt 53, the vehicle body and its supporting frame may be properly levelled and adjustably positioned with respect to the vehicle axle. However, it will be apparent that our improved spring shackle will effectively function in the manner herein described in connection with various other means than that herein specifically disclosed for operatively connecting the lower and upper shackle bushings with the sprung and unsprung masses of the vehicle, respectively. Finally, it will be noted that our invention comprises comparatively few parts of simple and rugged structural form, which can be fabricated at low cost, and will efficiently operate throughout the useful life of the vehicle with minimum maintenance or repair expense.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. In a vehicle, suspension means therefor, including inner and outer, substantially concentric members, a bushing of elastic material arranged between and fixed to said members, a lever having pivotal connection at one end with the unsprung vehicle mass, means connecting said inner member with the sprung vehicle mass, and means for attaching said outer member to the other end of said lever, in one position of the latter, when the vehicle is unloaded, said attaching means being operative to place said bushing under normal negative torsional stress which progressively decreases to substantially zero stress position, in the pivotal movement of said lever, as the vehicle is loaded to substantially full capacity.

2. In a vehicle having an axle and body frame, suspension means therefor, including a shackle link having substantially parallel spaced portions, a torsion spring member fixedly secured to each of said link portions, a housing enclosing and fixed to each spring member, means for attaching one of said housings in fixed relation to the vehicle body frame, a lever pivotally supported at one end upon the vehicle axle, means for attaching the other spring housing to the other end of said lever, comprising means on the housing rotatably displaceable with said housing from normal position with respect to the shackle link to negatively stress said torsion spring member and position said means for attachment to the lever in the normal relative positions of the vehicle body frame and axle.

3. The vehicle suspension means defined in claim 2, in which each spring member comprises a rubber bushing and each housing is provided with attaching flanges, disposed in predetermined angular relation to a plane normal to the bushing and including the axis thereof in the neutral or zero stress position of the bushing.

4. In combination with a vehicle body frame and axle, a shackle link having a lower end portion attached to the body frame, a lever disposed transversely of the vehicle and pivotally mounted at its inner end upon the axle, and means connecting the outer end of said lever with the upper end of the shackle link and resiliently resisting relative angular movement between the link and lever from a neutral torsionally unstressed position of said connecting means, said means including a bushing of elastic material secured in fixed relation to the link and lever under predetermined negative torsional stress in the normal relative position of the vehicle frame and axle, which progressively diminishes with the loading of the vehicle body, and said bushing being subjected to positive torsional stress only in response to abnormal vertical displacement of the vehicle axle relative to the body frame.

5. The vehicle suspension means defined in claim 4, in which means is provided for vertically adjusting the normal position of said lever relative to its pivotal axis to position the body frame with respect to the vehicle axle.

6. In a vehicle, suspension means including a lever pivotally connected at one end to the unsprung vehicle mass and a member connected at one end to the sprung vehicle mass, a torsion spring constituting a resilient pivotal connection between the other ends of said lever and member, said spring having a fixed connection with said member, and means connecting said spring to the lever comprising attaching means fixed to said spring and operable relative to said member to position said attaching means with respect thereto for attachment to the lever when the vehicle is unloaded, and to place said spring under normal negative stress which progressively decreases to substantially zero stress position in the relative movement of the sprung and unsprung vehicle masses as the vehicle is loaded to substantially full capacity.

DWIGHT E. AUSTIN.
WILLIAM B. FAGEOL.

REFERENCES CITED

The following references are of record in the file of this patent:

UNITED STATES PATENTS

| Number | Name | Date |
|---|---|---|
| 1,452,693 | Lord | Apr. 24, 1923 |
| 1,794,782 | Lord | Mar. 3, 1931 |
| 1,993,260 | Burns | Mar. 5, 1935 |
| 2,169,335 | Best | Aug. 15, 1939 |
| 2,207,465 | Leighton | July 9, 1940 |
| 2,216,455 | Piron | Oct. 1, 1940 |
| 2,223,741 | Rabe | Dec. 3, 1940 |
| 2,251,416 | Parker | Aug. 5, 1941 |
| 2,305,732 | Piron | Dec. 22, 1942 |
| 2,345,201 | Krotz | Mar. 28, 1944 |

FOREIGN PATENTS

| Number | Country | Date |
|---|---|---|
| 487,468 | Great Britain | June 21, 1938 |